United States Patent
Rippel et al.

(10) Patent No.: US 9,825,497 B2
(45) Date of Patent: Nov. 21, 2017

(54) COMPRESSED MOTOR WINDING

(71) Applicant: AeroVironment, Inc., Monrovia, CA (US)

(72) Inventors: Wally Ewald Rippel, Altadena, CA (US); Zaher Abdallah Daboussi, Arcadia, CA (US); Bradford M. Hori, Monrovia, CA (US); Scott Garret Berman, Los Angeles, CA (US); Bart Dean Hibbs, Simi Valley, CA (US)

(73) Assignee: AeroVironment, Inc., Monrovia ( * ) Notice: Subject to any disclaimer, the term of this patent is extended or adjusted under 35 U.S.C. 154(b) by 66 days.

(21) Appl. No.: 14/693,748

(22) Filed: Apr. 22, 2015

(65) Prior Publication Data

US 2015/0303755 A1 Oct. 22, 2015

Related U.S. Application Data

(63) Continuation of application No. 12/565,705, filed on Sep. 23, 2009, now Pat. No. 9,035,526.

(Continued)

(51) Int. Cl.
*H02K 3/14* (2006.01)
*H02K 3/00* (2006.01)
(Continued)

(52) U.S. Cl.
CPC ............... *H02K 3/14* (2013.01); *H02K 3/30* (2013.01); *H02K 3/32* (2013.01); *H02K 3/47* (2013.01); *H02K 7/14* (2013.01); *H02K 9/02* (2013.01); *H02K 9/06* (2013.01); *H02K 9/14* (2013.01); *H02K 9/22* (2013.01); *H02K 16/02* (2013.01);

(Continued)

(58) Field of Classification Search
CPC ................................. H02K 3/12; H02K 17/12
USPC ....... 310/201, 202, 203, 208, 213, 198, 206, 310/207
See application file for complete search history.

(56) References Cited

U.S. PATENT DOCUMENTS 3,811,311 A * 5/1974 Barone ................. B21C 37/042
72/278
5,319,844 A 6/1994 Huang et al.
(Continued)

FOREIGN PATENT DOCUMENTS

JP 63194543 A 8/1988
JP 08-037769 A2 2/1996
(Continued)

OTHER PUBLICATIONS

Australian Government IP Australia (IPAU); Examiner's First Report (Exam_Report) for corresponding Australia case application No. 2009296682 entitled Compressed Motor Winding by Rippel et al.; dated Sep. 23, 2009, Australian Government Intellectual Property Australia; 2 pgs.
(Continued)

*Primary Examiner* — Jose Gonzalez Quinones
(74) *Attorney, Agent, or Firm* — Christopher R. Balzan; Eric J. Aagaard

(57) ABSTRACT

In one possible embodiment, a motor winding is provided having a high density multi-conductor wire bundle with a compacted Litz wire bundle. The compacted Litz wire bundle has a serpentine configuration with a central portion having compacted Litz wire and end turns having non-compacted Litz wire.

24 Claims, 9 Drawing Sheets

Related U.S. Application Data

(60) Provisional application No. 61/194,098, filed on Sep. 23, 2008, provisional application No. 61/194,099, filed on Sep. 23, 2008, provisional application No. 61/194,056, filed on Sep. 23, 2008.

(51) Int. Cl.

| | | |
|---|---|---|
| *H02K 21/00* | (2006.01) | |
| *H02K 3/47* | (2006.01) | |
| *H02K 7/14* | (2006.01) | |
| *H02K 16/02* | (2006.01) | |
| *H02K 9/06* | (2006.01) | |
| *H02K 9/14* | (2006.01) | |
| *H02K 9/02* | (2006.01) | |
| *H02K 9/22* | (2006.01) | |
| *H02K 3/30* | (2006.01) | |
| *H02K 3/32* | (2006.01) | |
| *H02K 21/12* | (2006.01) | |

(52) U.S. Cl.
CPC ............ *H02K 21/12* (2013.01); *Y02E 10/725* (2013.01); *Y10T 29/49009* (2015.01)

(56) References Cited

U.S. PATENT DOCUMENTS

| | | | | |
|---|---|---|---|---|
| 5,723,933 | A * | 3/1998 | Grundl | H02K 3/04 310/208 |
| 6,492,595 | B2 * | 12/2002 | Sexton | H01B 7/0823 174/117 A |
| 6,562,884 | B1 * | 5/2003 | Tang | C08G 59/5093 523/443 |
| 6,649,844 | B2 | 11/2003 | Kusumoto et al. | |
| 6,960,857 | B2 * | 11/2005 | Oohashi | H02K 3/12 310/179 |
| 7,402,934 | B1 | 7/2008 | Gabrys | |
| 7,834,510 | B2 * | 11/2010 | Winn | H02K 3/47 310/261.1 |
| 8,823,238 | B2 | 9/2014 | Greaves et al. | |
| 2002/0047475 | A1 | 4/2002 | Kusumoto et al. | |
| 2002/0050395 | A1 * | 5/2002 | Kusumoto | H02K 3/12 174/128.2 |
| 2003/0163912 | A1 | 9/2003 | Tokizawa et al. | |
| 2003/0164656 | A1 | 9/2003 | Sakurai | |
| 2004/0056538 | A1 | 3/2004 | Du et al. | |
| 2006/0261683 | A1 | 11/2006 | Du et al. | |
| 2007/0145854 | A1 | 6/2007 | Enomoto et al. | |
| 2007/0180682 | A1 | 8/2007 | Ueda et al. | |

FOREIGN PATENT DOCUMENTS

| | | |
|---|---|---|
| JP | 800037769 A2 | 2/1996 |
| JP | 20020539307 A | 3/2000 |
| JP | 2002027693 A2 | 1/2002 |
| JP | 2002-539307 A | 11/2002 |
| JP | 2003088021 A2 | 3/2003 |
| KR | 10-2002-0005955 A | 1/2002 |
| KR | 10-2003-0024609 A | 3/2003 |

OTHER PUBLICATIONS

International Searching Authority; International Search Report (PCT_ISR) for corresponding PCT case application No. PCT/US2009/058116 entitled Compressed Motor Winding by Rippel et al.; dated Dec. 2, 2011 from US International Searching Authority; 2 pgs.

International Searching Authority; Written Opinion of the International Searching Authority (PCT_WO) for corresponding PCT/US2009/058116 entitled Compressed Motor Winding by Rippel et al.; dated Dec. 23, 2011 from US International Searching Authority; 6 pgs.

International Searching Authority; (PCT_Examiners_Search_History) for corresponding PCT case application No. PCT/US2009/058116 entitled Compressed Motor Winding by Rippel et al.; dated Dec. 23, 2011 from USInternational Searching Authority; 3 pgs.

Hungarian Intellectual Property Office (HIPO); Written Opinion (WO) and Search Report (SR) for corresponding Singapore patent application No. 201104429-4 entitled Compressed Motor Winding by Rippel et al.; dated May 30, 2013 from Hungarian Intellectual Property Office, 18 pgs.

State Intellectual Property Office of China (SIPO); Office Action (OA) and Search Report (SR) for Chinese patent application No. 200980146810.5, entitled Compressed Motor Winding by Rippel et al.; dated Aug. 22, 2013 from State Intellectual Property Office, 11 pgs.

Japan Patent Office (JPO); Office Action (OA) machine translation for corresponding Japanese patent application No. 2011-529198, entitled Compressed Motor Winding by Rippel et al.; dated Dec. 17, 2013 from Japan Patent Office, 3 pgs.

Hungarian Intellectual Property Office (HIPO); Examination Report (Exam Rpt) for corresponding Singapore patent application No. 201104429-4 entitled Compressed Motor Winding by Rippel et al.; dated Jan. 16, 2014 from Hungarian Intellectual Property Office, 10 pgs.

Korean Intellectual Property Office (KIPO); Office Action (OA) for Korean patent application No. 10-2011-7009278, entitled Compressed Motor Winding by Rippel et al; dated Oct. 5, 2015 from Korean Intellectual Property Office, 6 pgs, untranslated (Brief Summary (in English) of Reasons for Rejections in english cited herewith).

Brief Summary (in English) of Reasons for Rejections in Office Action (OA) for Korean patent application No. 10-2011-7009278 dated Oct. 5, 2015, 1 pg.

Canadian Intellectual Property Office (CIPO) First Office Action (OA1) and Examination Search Report (Search_Rpt) for corresponding Canada case application No. 2,774,918 entitled Compressed motor winding by Rippel et al.; dated Oct. 13, 2016 from Canadian Intellectual Property Office; 4 pgs.

\* cited by examiner

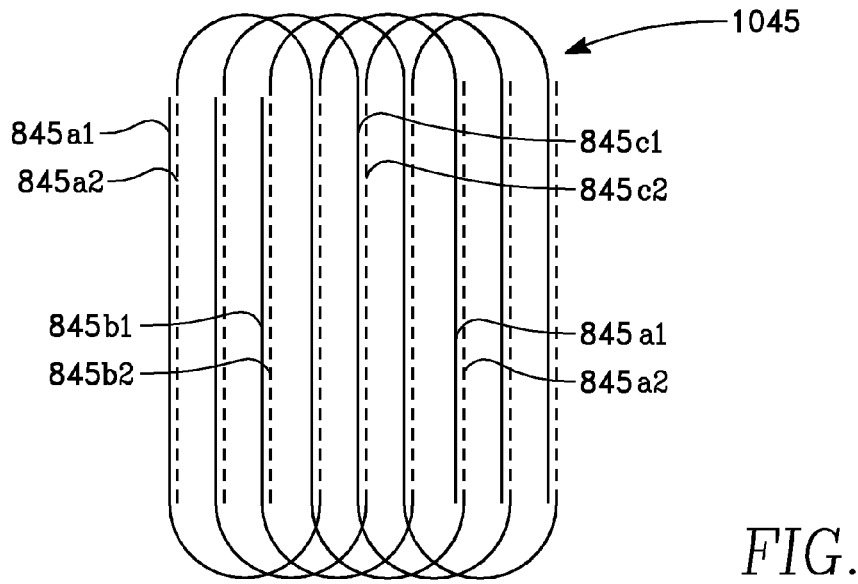
| A1 | C̄2 | B1 | Ā2 | C1 | B̄2 | A1 | C̄2 | Top Layer |
| A2 | C̄1 | B2 | Ā1 | C2 | B̄1 | A2 | C̄1 | Bottom Layer |
FIG. 10
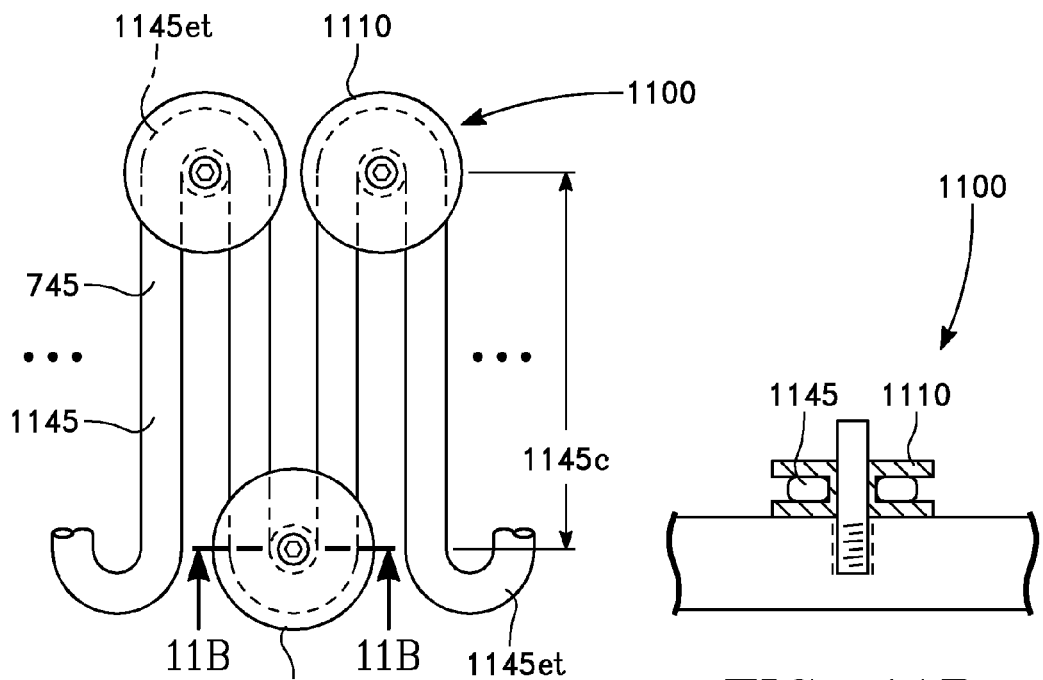
FIG. 11A
FIG. 11B

COMPRESSED MOTOR WINDING

CROSS REFERENCE TO RELATED APPLICATIONS

The present application is a continuation of U.S. patent application Ser. No. 12/565,705, filed Sep. 23, 2009, by Daboussi et al., entitled COMPRESSED MOTOR WINDING, herein incorporated by reference in its entirety, which claims the benefit of the following applications which are herein incorporated by reference in their entireties:

U.S. Provisional Application No. 61/194,098, filed Sep. 23, 2008, by Daboussi, entitled WINDING DESIGN FOR IRONLESS P.M. MOTOR;

U.S. Provisional Application No. 61/194,099, filed Sep. 23, 2008, by Daboussi et al., entitled PROPELLER DRIVE UNIT FOR HALE UAV; and U.S. Provisional Application No. 61/194,056, filed Sep. 23, 2008, by Hibbs, entitled FLUX CONCENTRATOR FOR IRONLESS MOTORS.

The present application is also related to the following applications, which are hereby incorporated by reference in their entireties:

U.S. Non-provisional application Ser. No. 12/565,715, filed Sep. 23, 2009, entitled MOTOR AIR FLOW COOLING, by Daboussi et al, issued as U.S. Pat. No. 8,604,652;

U.S. Non-provisional application Ser. No. 12/565,710, filed Sep. 23, 2009, entitled STATOR WINDING HEAT SINK CONFIGURATION, by Daboussi et al, issued as U.S. Pat. No. 8,723,378; and U.S. Non-provisional application Ser. No. 12/565,718, filed Sep. 23, 2009, entitled FLUX CONCENTRATOR FOR IRONLESS MOTORS, by Hibbs et al.

BACKGROUND

Electric motors for vehicles need to have high efficiency to conserve power. Furthermore, in vehicles, and in particular in aerial vehicles, light weight and compact electric motors are also desirable. Thus, ironless motors are often used which can provide the benefit of no iron losses due to changing flux direction.

Motors are normally rated for the peak power and efficiency of the motor. In some applications, high part load efficiency is desired, which is high efficiency when machine is loaded at a partial load, i.e. 15% or some other percent.

What is needed is a higher efficiency compact motor.

SUMMARY

In one possible embodiment, a motor winding is provided that has a high density multi-conductor wire bundle comprised of compacted Litz wire.

In one possible implementation, a method for forming a motor winding is provided which includes compressing a Litz wire to form a compacted Litz wire and forming the winding with the compacted Litz wire.

In one possible embodiment, a motor winding is provided having a high density multi-conductor wire bundle with a compacted Litz wire bundle. The compacted Litz wire bundle has a serpentine configuration with a central portion having compacted Litz wire and end turns having non-compacted Litz wire.

BRIEF DESCRIPTION OF THE DRAWINGS

The features and advantages of the present invention will be better understood with regard to the following description, appended claims, and accompanying drawings where:

FIG. 10 is a simplified illustration of a two-layer winding.

FIG. 11A is a simplified top view of an example wire bending tool.

FIG. 11B is a simplified side view of a mandrel of FIG. 11A along the 11B-11B line of FIG. 11A.

DESCRIPTION

Figure 1:
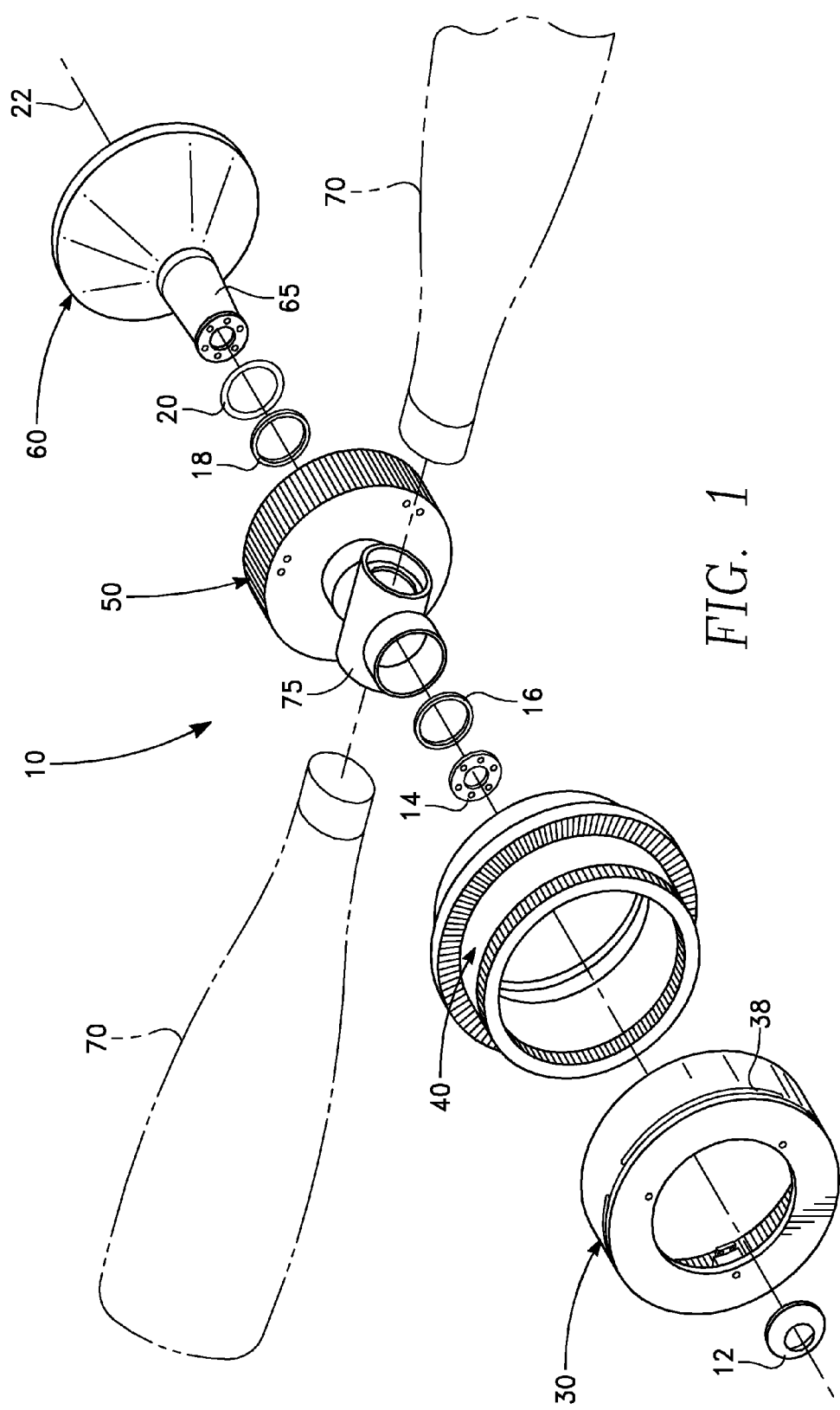
FIG. 1 shows a simplified exploded perspective view of an example motor.

FIG. 1 shows a simplified exploded perspective view of an example motor 10 along axis 22. A stator 40 is secured to a housing 60. Inner rotor 50 and outer rotors 30 are secured to each other and surround the stator 40. An optional propeller hub 75, into which propeller blades 70 are mounted, is secured to the inner rotor 50. The propeller hub 75 rotatably mounts on the spindle 65 with bearings 16 and 18. The bearings 16 and 18 are retained by retainers 20 and 14 and cover 12.

Figure 2:
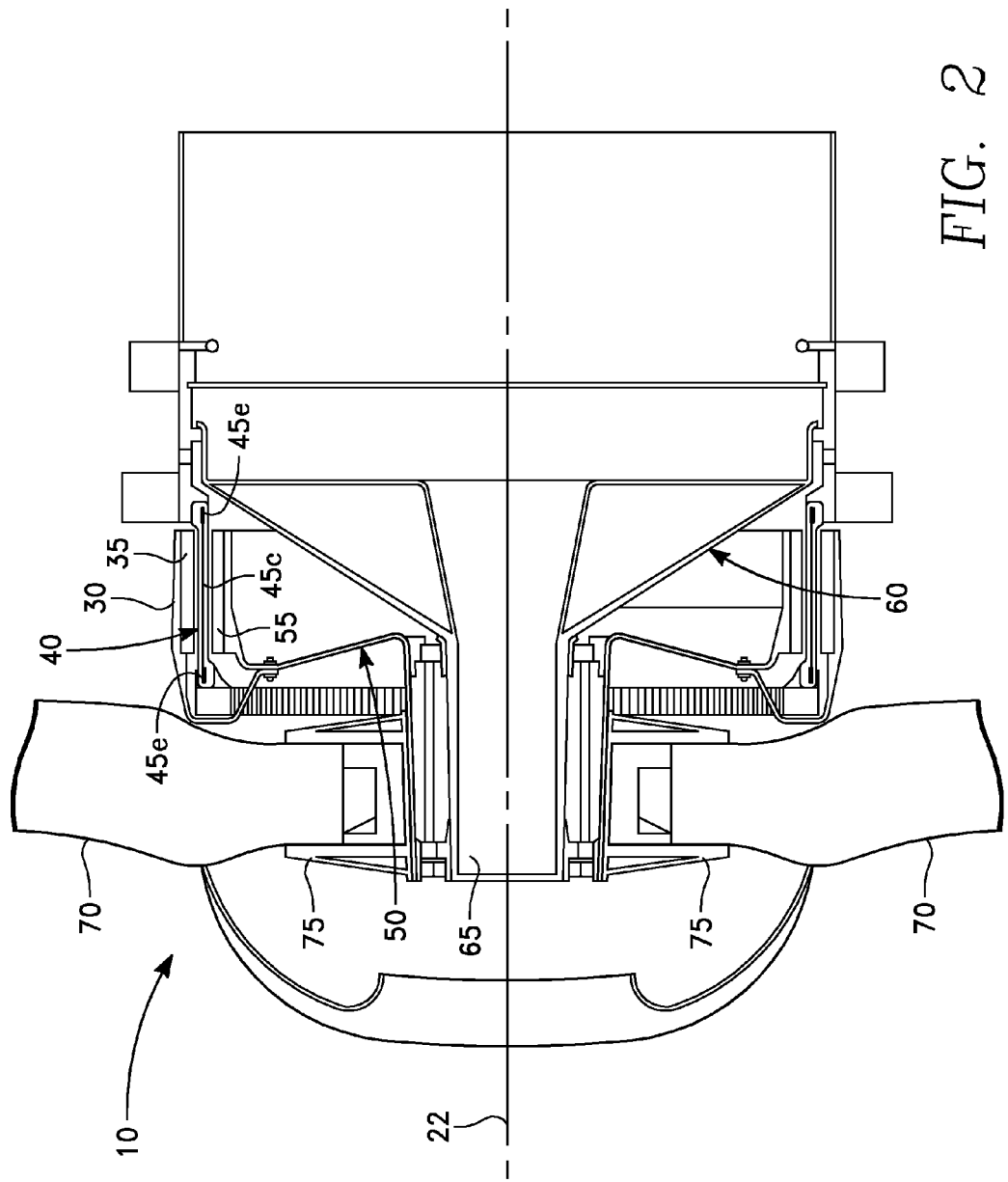
FIG. 2 shows a simplified cross-sectional side view of the motor of FIG. 1 along its longitudinal axis.

FIG. 2 shows a simplified cross-sectional side view of the motor 10 of FIG. 1 along its longitudinal axis 22. The stator 40 is located between magnets 35 and 55 of the inner and outer rotors 50 and 30, respectively. The propeller hub 75 is bonded to the inner rotor which is rotatably mounted on the spindle 65. The spindle 65 may be fabricated of carbon fiber or other suitable material.

Figure 3:
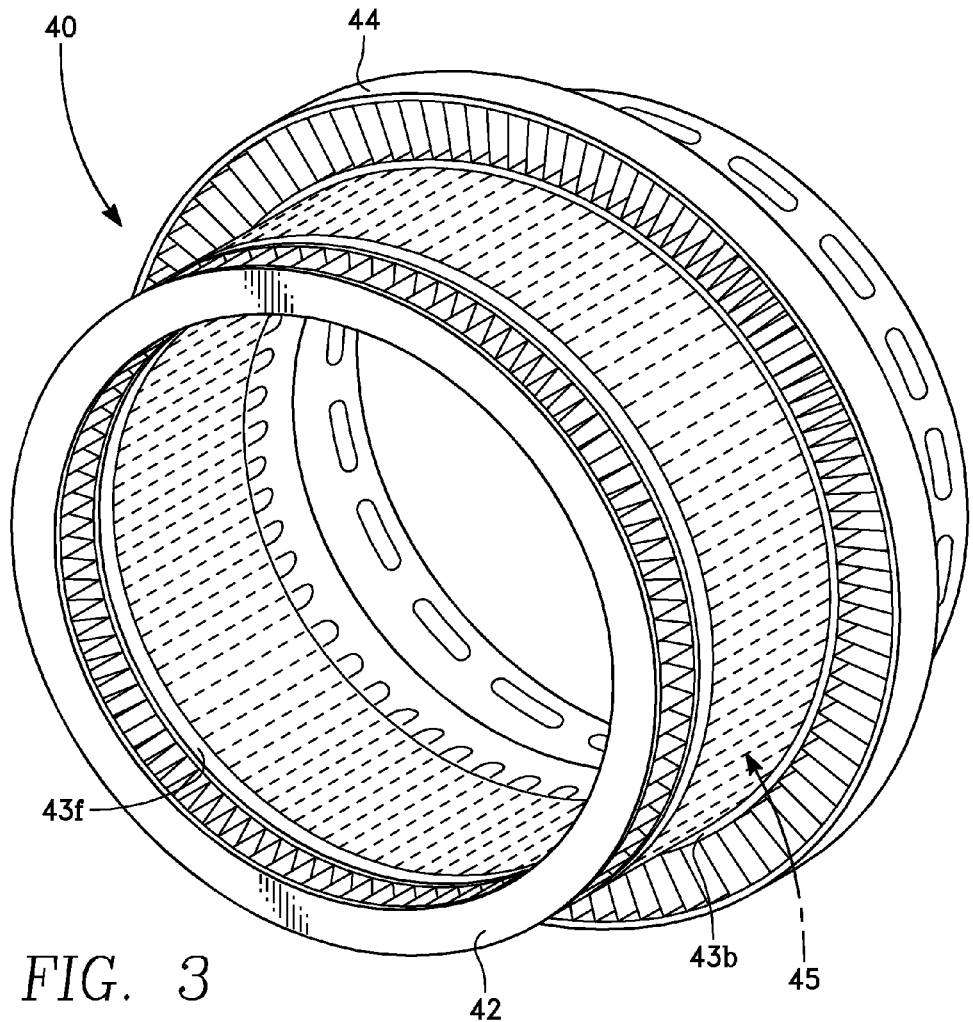
FIG. 3 shows a simplified perspective view of the stator having a winding.

FIG. 3 shows a simplified perspective view of the stator 40 having a winding 45. The winding 45 is encased within the stator 40. Cooling fins 42 and 44 are bonded to the front and back stator yoke portions 43f and 43b, respectively.

Figure 4:
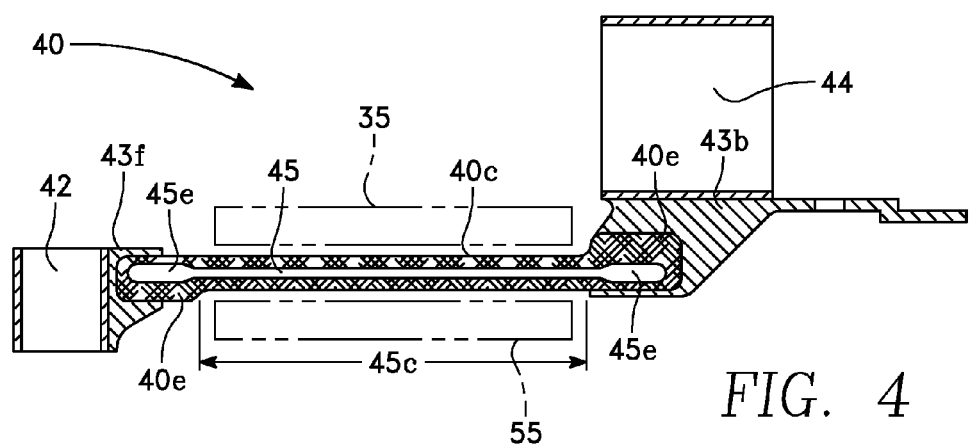
FIG. 4 shows a simplified cross section of the stator of FIG. 3.

FIG. 4 shows a simplified cross section of the stator 40 of FIG. 3. The winding 45 has a compressed central region 45c. The winding 45 is compressed in the central region 45c so that more conductor material of the winding 45 can be placed between the magnets 35 and 55 (shown in phantom line) and so that more conductor can be located closer to the magnets 35 and 55 of the rotors 30 and 50 to provide increased magnetic field strength in the winding 45. In this embodiment, it is not necessary that the ends 45e of the winding 45 also be compressed. This is because the ends 45e of the winding 45 do not pass between the magnets 35 and 55 of the rotors 30 and 50.

In accordance with various embodiments, for both axial and radial ironless P.M. or permanent magnet machines, the winding 45 should have a high packing density to minimize $I^2R$ losses and a construction that minimizes eddy losses. The magnets 35 and 55 in the rotor 30 and 50 pass over/under a central active region 45c of the stator winding 45, and not over/under the edges 45e of the stator winding 45. Thus, in various embodiments, the active region 45c of the winding 45 should have as much conductor, i.e. copper, as possible in the volume of the active region 45c.

Also, in various embodiments, the winding 45 should have high rigidity so that the winding 45 does not deflect and contact the magnets 35 or 55, and to adequately withstand the turn-to-turn voltages and associated forces. The winding 45 is enclosed in a suitable material, such as epoxy.

For most embodiments, as excessive heat can damage the magnets 35 and 55, the winding 45 should also have a low thermal impedance contact to the peripheral yoke portions 43f and 43b so that heat is easily removed to inhibit excessive temperature rise within the motor 10. In various embodiments, the winding is encased in a thermally conductive material to transfer heat away from the winding 45 to the cooling fins 42 and 44 via the front and back yoke portions 43f and 43b, respectively. Thus, in some embodiments, the winding 45 is encased in epoxy mixed with a thermally conductive filler such as aluminum oxide, boron nitride, or other material that promotes heat transfer.

Figure 5:
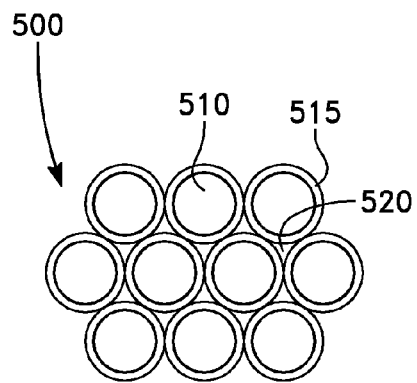
FIG. 5 shows a simplified cross section of a Litz wire bundle.

Turning to FIG. 5, to minimize eddy losses, Litz wire 500 may be used for the winding 45 (FIG. 3). FIG. 5 shows a simplified cross section of a Litz wire bundle 500. One source for Litz wire is New England Wire Technologies, of Lisbon, N.H., www.newenglandwire.com, which is distributed by Cooner Wire company, in Chatsworth, Calif., www.coonerwire.com. Litz wire 500 is a bundle of small conductor wires 510, insulated 515 from each other, and braided. Litz wire 500 is braided to allow each wire 510 to interact with the same average magnetic field over time, so that the same voltage develops across each wire. This inhibits voltages and conduction between the individual wires 510.

Figure 6:
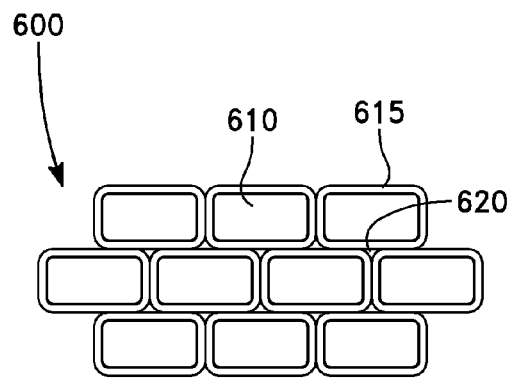
FIG. 6 shows a simplified cross section of compacted Litz wire bundle.

Turning to FIG. 6, in various embodiments, to further improve performance, the Litz wire 500 of FIG. 5 is compacted as illustrated in FIG. 6. As shown in FIG. 5, the individual wires 510 are round so have spaces 520 between the wires 510. The compacted Litz wire 600 of FIG. 6, has greatly reduced spacing 620 between the wires 610. Thus, the conductor density is greater.

The compacted Litz wire 600 may be used to form the winding 45 (FIG. 3). The Litz wire 600, with multiple jacketed 615 conductors 610 are mutually twisted and compressed to produce conductors 610 having a cross section that minimizes voids 620, i.e. rectangular cross section conductors 610. In one embodiment, Litz wire 500 (FIG. 5) having bundles 500 of one hundred conductors 510 (FIG. 5) is used. A key parameter is the "bundle pitch"— which is the length over which each bundle undergoes a complete 360 degree twist.

Figure 7:
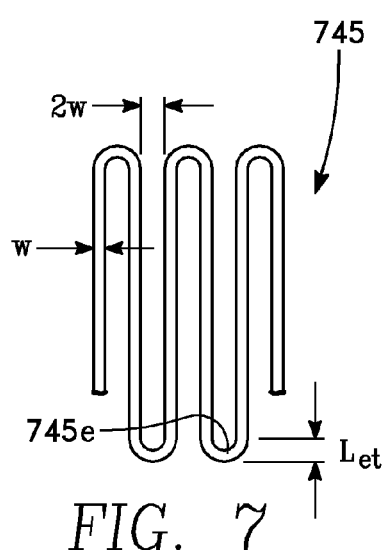
FIGS. 7 and 7A show a simplified example of a plain winding in top and cross sectional views, respectively.
Figure 7A:
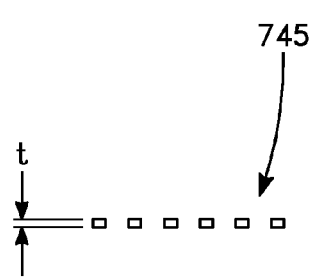

Turning to FIGS. 7 and 7A, which show simplified example of a plain winding 745 in top and cross sectional views, respectively. For some embodiments, the bundle pitch should be equal to approximately twice the end 745e turn length $L_{et}$. When this relation is maintained, end turns 745e can be formed with minimal distortion and the forming process is least difficult.

Typically, the wire 745 thickness (t) is less than the width (w). As such, a special bending jig is require which constrains the conductor "in plane" while the bend is applied.

FIGS. 11A and 11B are a simplified illustration of a possible implementation in a process for forming an embodiment of the winding. For both axial and radial designs, in some implementations the first step is to force the Litz into a serpentine as shown in FIG. 7. Thus, for a 3 phase winding, at least three such conductors 745 must be formed.

To form the serpentine bundle 745 The Litz wire 500 is place on a bending tool 1100, clamped, and bent. After bending, it is removed from the bending tool and placed in a press. The press compacts the central region 45c of the Litz wire bundle 500 (FIG. 5) to provide the compressed winding 600 shown in cross section in FIG. 6.

Figure 8:
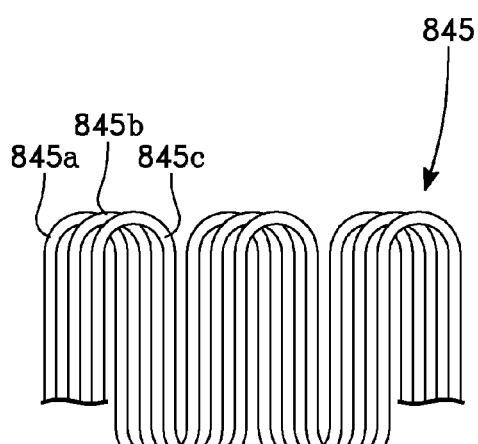
FIG. 8 is a simplified illustration of a non-woven three phase winding.
Figure 9:
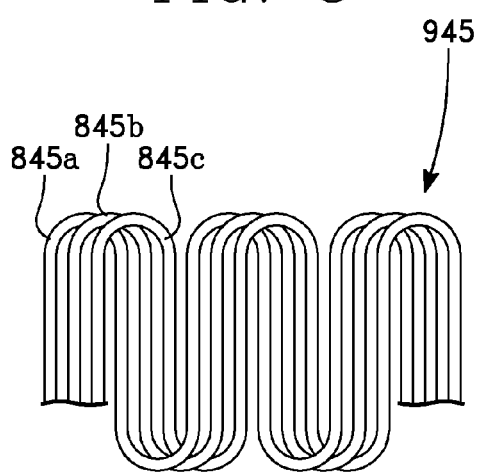
FIG. 9 is a simplified illustration of a woven three phase winding.

After bending and compressing, the compressed winding 845a may be, combined with other similar compressed bundles 845b and/or 845c by overlapping 845 as shown in FIG. 8, by weaving 945 as shown in FIG. 9, or layered 1045 as shown in FIG. 10, or with other patterns and combinations of such.

Referring to FIGS. 8 and 9, for one winding embodiment, each pole has 1 turn and the resulting winding is a single layer. For a three phase winding, the three conductors can be "non-woven" and layered as shown in FIG. 8 or woven—as shown is FIG. 9. Shown in FIG. 8, the compacted Litz wire winding 845b is placed in phase over compacted Litz wire winding 845a, then compacted Litz wire winding 845c is placed over compacted Litz wire windings 845b and 845a. No weaving is applied in FIG. 8. In FIG. 9, the compacted Litz wire windings 845a, 845b, and 845c are woven into a single winding 945.

Embodiments with two turns per pole may be achieved via the techniques of FIGS. 8 and 9, with six compacted Litz wire windings are used in the place of three, but the winding may remain a single layer.

Alternatively, a two-layer winding 1045 can be used as shown in FIG. 10. The two-layers provide the winding 1045 the advantage of reduced end turn bulge and an increased end turn surface area. This aids heat transfer in various embodiments. In this embodiment, the windings $845a_1$, $845b_1$, $845c_1$, $845a_2$, $845b_2$, and $845c_2$, are both woven and layered in top and bottom layers such that the windings both weave between the other windings and between the top and bottom layers.

The layer scheme above can be extended by using increased numbers of compacted Litz wire windings having proportionately reduced widths. With this approach 4, 6 . . . 2n number of turns per pole can be achieved.

Referring to FIGS. 11A and 11B, forming tool 1100 allows you to start with a straight wire and keep the central portions 1145c straight while forming the end turn bends 1145et and to keep the wire 1145 aligned so that it does not separate.

In addition to the serpentine bends, in various embodiments, the end turns 1145et are twisted "out of plane" such that groups (e.g. three) serpentine Litz wires 1145 can nest together. This allows the central portions 1145c to stack together more compactly, to reduce the thickness of the stator (FIG. 4) in the central portion 40c (FIG. 4) so that more conductor can be placed in the stator 40 and fit between the magnets 35 and 55 of the inner and outer rotors 30 and 50 (FIG. 2).

As discussed further below, the serpentine wire 1145 is compressed after it is removed from the bending machine 1100. The end turns 1145et may be held within a forming tool when the center straight portions 1145c are compressed.

Referring to FIGS. 11A and 11B, in one implementation, after the serpentine bends are formed, the end-turns are twisted out of plane so that wires can be nested/weaved together. FIG. 11A is a simplified top view of an example wire bending tool. FIG. 11B is a simplified side view of a mandrel 1110 of FIG. 11A, along the 11B-11B line of FIG. 11A.

Figure 12A:
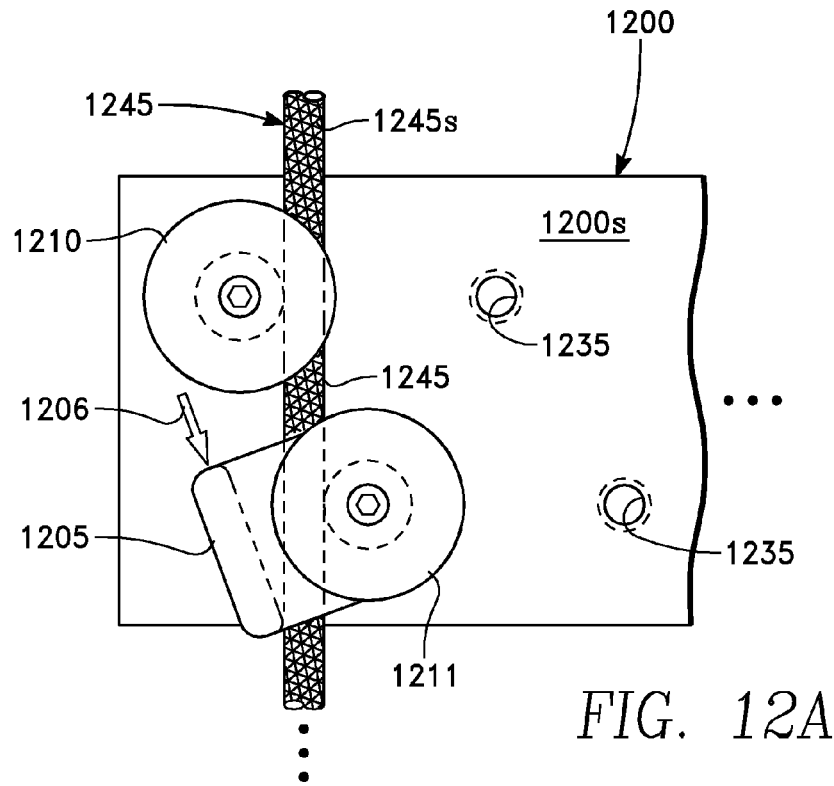
FIGS. 12A and 12B show simplified top views of bending jigs.
Figure 12B:
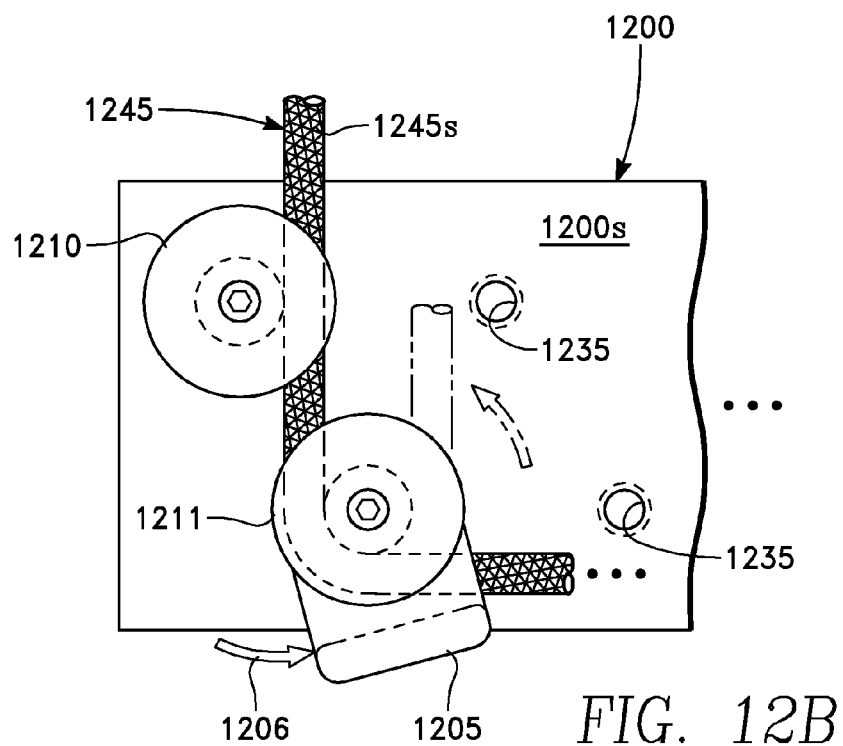

Turning to FIGS. 12A and 12B, in one implementation, to start bending the winding, a first mandrel 1210 is screwed into a first left hole a top row of a jig 1200. The jig 1200 has two rows of offset mandrel screw holes. The hole 1235 placement will vary depending on the width of the wire 1245, and the length and width of the magnets of the rotor(s). A second mandrel 1211 is screwed into the first left hole in lower row. The wire 1245 is inserted into, and extending between, the first and second mandrels. The first mandrel 1210 is tightened to hold the wire 1245 in place.

While holding the start 1245s of the wire 1245, insert U shaped guide 1205 onto wire 1245 and form the wire 1245 around the second mandrel 1211 by hand, pulling with about 25 pounds of force at the same time pulling U shaped guide 1205 around as indicated by arrow 1206 in FIGS. 12A and 12B. In various embodiments, the wire 1245 is over bent until the wire 1245 touches first mandrel 1210.

Typically, the insulation surrounding the wire bundle 1245 will need to be pulled, or smoothen out during/after each bend, as there will be excess material leftover after each bend.

Insert a third mandrel (not shown), and so on, and continue the same operation until you reach a desired number of bends, for example 20 bends. Alignment marks may be added to the centers, or elsewhere, along with the winding identification number on each section if the winding is to be weaved.

As the mandrels are removed a heat gun is used to heat each end turn, which is then cooled to hold the shape of the end turns after the mandrels are removed. The bends may be slightly squeezed, to over bend while heating, to help maintain the shape of the end turns after the end turn is cooled.

After sufficient turns have been added to complete a perimeter for an annular winding, the direction of the wire is reversed so that it goes back on itself. There are two different methods that can be used to accomplish this as illustrated in FIGS. 13 and 14.

Figure 13:
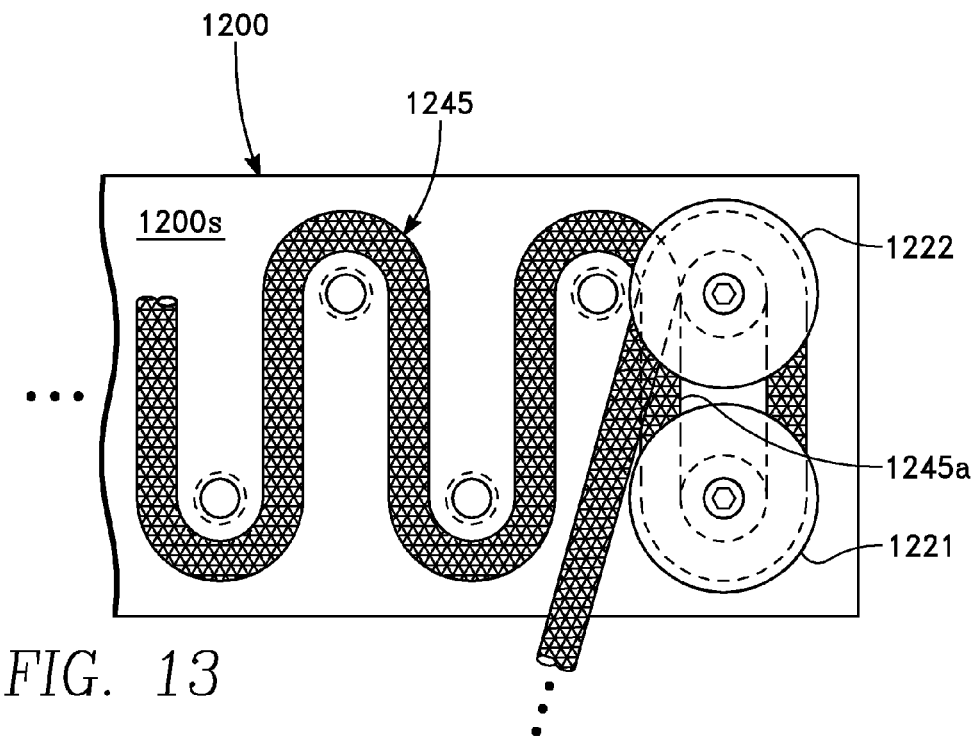
FIGS. 13 and 14 show simplified top views of bending jigs illustrating alternate implementations for reversing the direction of the wires.
Figure 14:
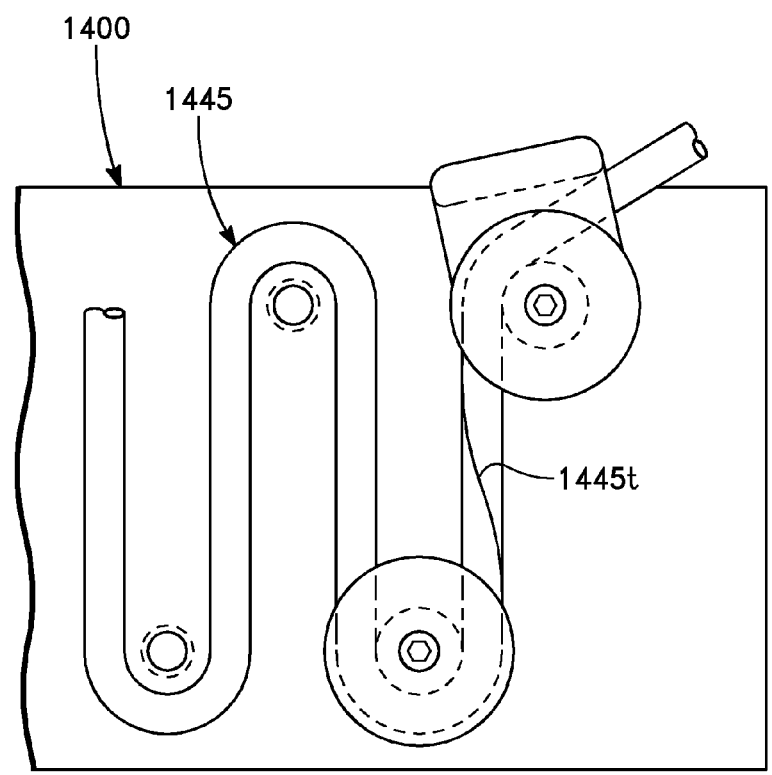

FIGS. 13 and 14 show simplified top views of bending jigs 1200 and 1400, respectively, illustrating alternate implementations for reversing the direction of the wires 1245 and 1445, respectively. As show in FIG. 14, the wire 1445 can be twisted 180 degrees, illustrated at 1445t. When there is limited space between the mandrels in the different rows, or the Litz wire 1245 is relatively wide, the implementation of FIG. 13 may be utilized.

Shown in FIG. 13, there are two holes for mandrels 1221 and 1222 that are vertically in line, rather than offset or staggered. A mandrel 1222 with a cut out (not shown) on the bottom (adjacent the jig surface 1200s) may be used to clear the last winding 1245a, and may also clamp and hold the last winding 1245a from moving.

Making two turns in the same direction puts stress on the wire 1245, so it is advantageous to place as much bend in the reversing turn around mandrel 1222, for example about 120 degrees, or more, around mandrel 1222. The wire 1245 may then be loaded again at the front of the bending jig 1200 to bend the second section. An alignment mark may be placed on the wire 1245 before removing it from the mandrels 1221 and 1222 to transfer it to the front of the bending jig 1200.

After forming the coils but before braiding, the central straight portions 1145c (shown in FIG. 11A) may be compressed with 15-25 tons, or more, in a press to form the compacted Litz wire 600 of FIG. 6. The end turns 1145et (shown in FIG. 11A) are not compressed with the 25 ton press, but do have to fit within the epoxy mold to form the stator. The, epoxy mold does compress the ends turns 1145et, but not so that it forms the compacted conductors 600 as shown in FIG. 6.

Figure 15:
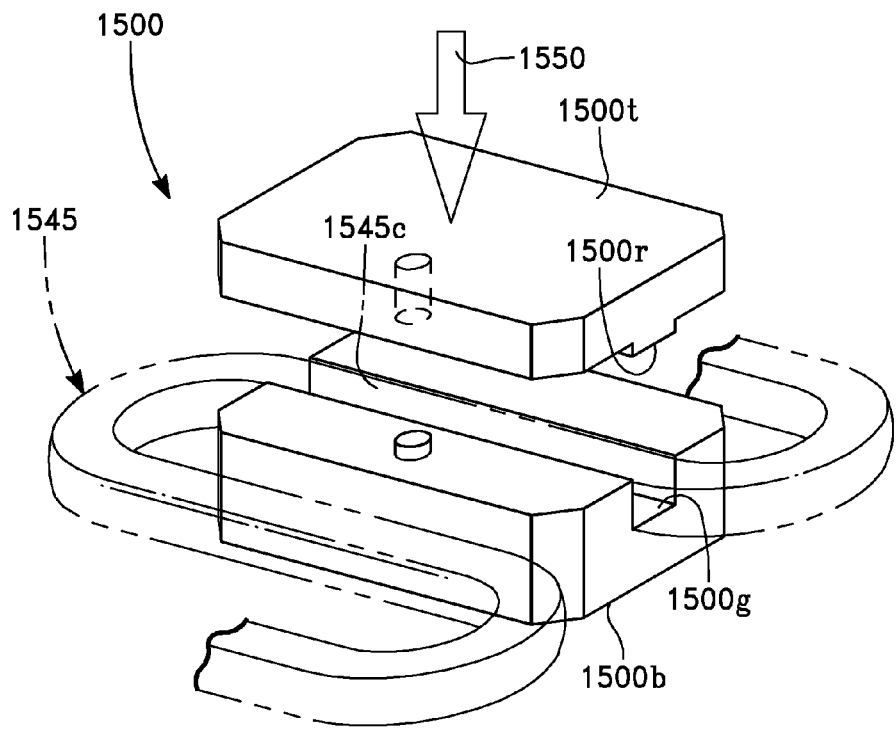
FIG. 15 shows a simplified perspective view of a pressing tool.
Figure 16:
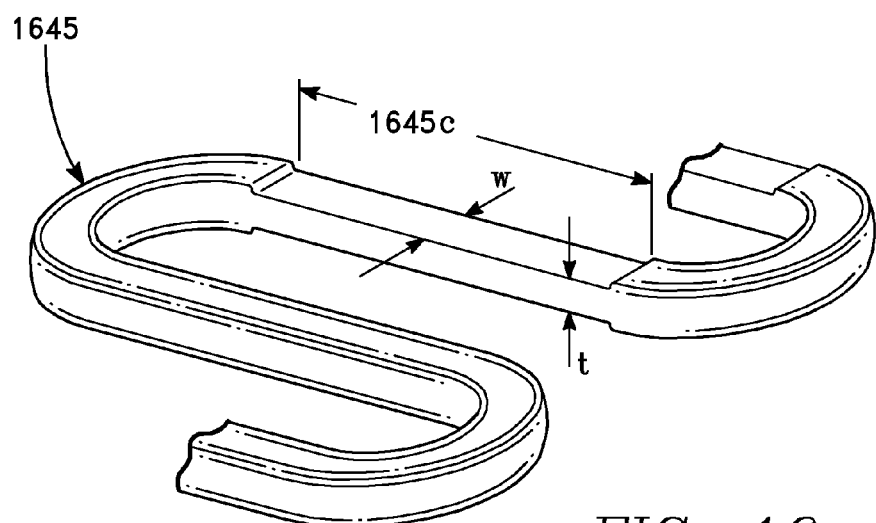
FIG. 16 shows a perspective view of a bent Litz wire after compacting in the pressing tool of FIG. 15.

Turning to FIG. 15, shown is a simplified perspective view of a pressing tool 1500, which may be used to compress and straighten the central straight portion 1645c in a hydraulic press 1550. Alignment marks may be used to line up the center of the central straight portion 1545c within the groove 1500g in the pressing tool 1500. The top plate 1500t has a rail or tongue 1500r that fits in the groove 1500g and compresses the central straight portion 1545 within the groove 1500g. In one embodiment, the pressing tool 1500 and press 1550 produce a compacted straight central portion 1645c measuring approximately 0.09" thick (t) by no wider than 0.425" wide (w), shown in FIG. 16. FIG. 16 shows a perspective view a Litz wire 1645 after compacting in the pressing tool 1500 of FIG. 15.

Alignment marks may be place on the wire while in the pressing tool 1500, or after compression to indicate the compressed central straight portion 1645c to facilitate weaving.

The compacted Litz wire 600 (FIG. 6), ends up having higher packing density than the original. It minimizes the gaps between the individual wires within the Litz wire 600 (FIG. 6). This compacted Litz wire has greater density so that more copper can fit between the stator and rotor. Further, because the wire has planar surface it stacks together better when braided so can be placed closer together, and the braided structure can be located closer to the magnets across the air gap.

Figure 17:
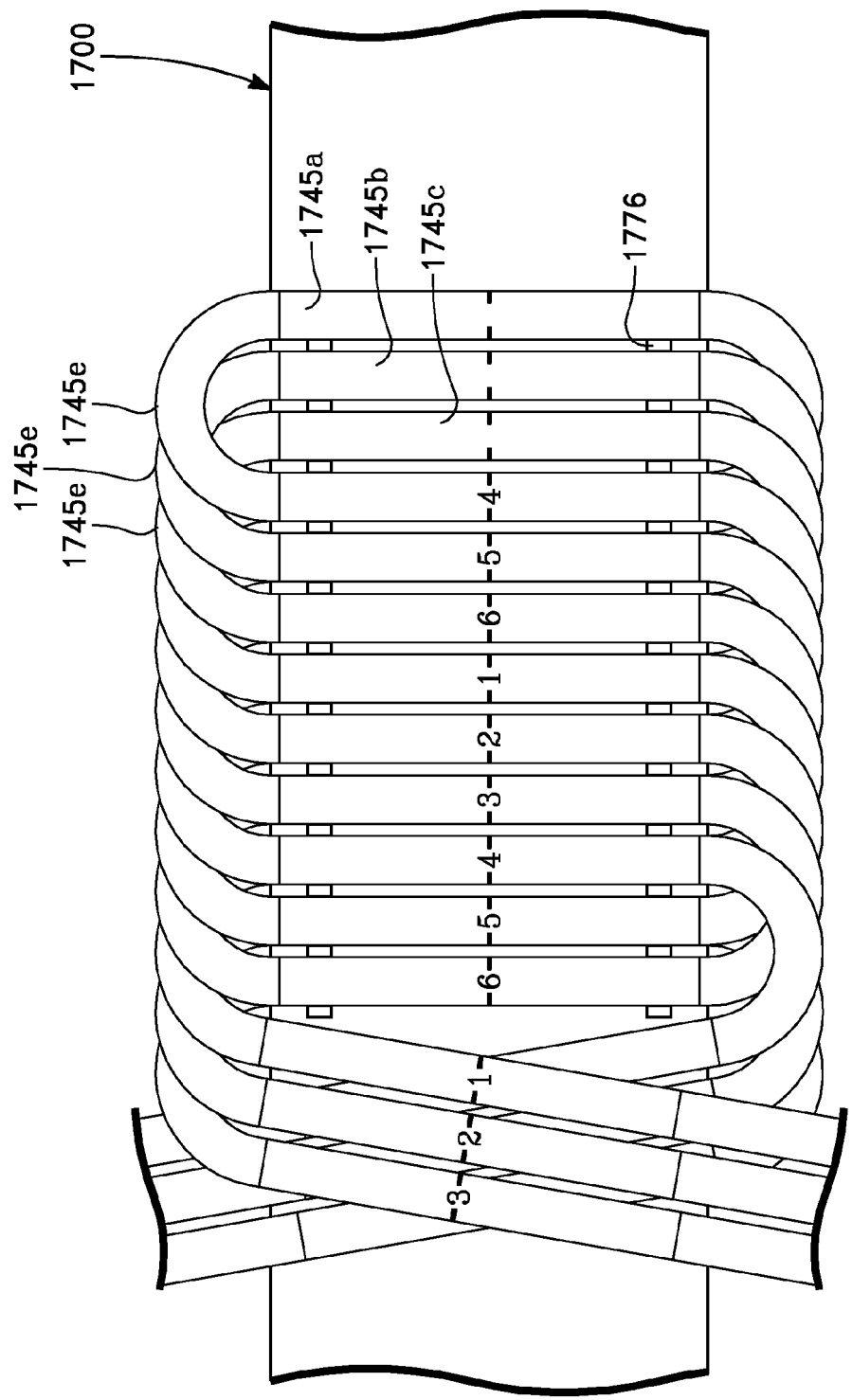
FIG. 17 shows a top view of woven compacted Litz wire.

Referring to FIG. 17, after the Litz wire bundle is compacted, the Litz wire bundles may be weaved with other Litz wire bundles. Bent and compacted Litz wire bundles are place in shuttles (not shown), or sleeves, for weaving on an alignment jig 1700. When weaving three windings, vertically orienting the shuttles (not shown) and windings therein, with number 4 winding in front, then number 5 and number 6, then number 1, number 2, and number 3 in back facilitates weaving, in some implementations.

FIG. 17 shows and end reversing turns 1745e for three wires 1745a, 1745b, and 1745c. The wires 1745a, 1745b, and 1745c can be marked with numbers during the bending for use in the braiding, for example winding 1745a may be marked as number 1 on one side and the second section (after the reversing turn) as number 4. Second coil 1745b will be number 2 and number 5, third coil 1745c number 3 and number 6.

The alignment jig 1700 aligns the Litz wires during the weaving process so that turn pitch is accurately defined. Lay the turnaround winding in the first 3 slots on the alignment jig 1700 making sure they are centered. Then lay windings 1, 2 and 3 in the next three slots. Then weave by picking up the shuttle with number 4 and move to the rear of the stacks. Insert the number 4 winding over the number 1 winding then the next number 4 turn in the empty slot next to the number 3 winding. Next move shuttle number 5 to the rear, then the number 5 wire turn lays over the number 2 wire turn, and the next number 5 wire turn is placed in the slot next to the number 4 wire, and so on.

To hold the wires 1745*a*, 1745*b*, and 1745*c* from moving, place the nylon tubes (not shown) over, or between, each tang 1776 as the wires 1745*a*, 1745*b*, and 1745*c* are weaved.

The woven compacted Litz wire is stitched with material, such as lacing cord, so that end turns are locked together and so that the completed winding can be handled after removal from alignment jig 1700. For example, there may be four lacings total, one on each edge for the end turns, and one on either side of the central compacted region.

Clean the braided and laced winding with acetone or alcohol and remove it from the alignment tool 1700 and place it on a steel hoop (not shown) to support the braided and laced winding when loading it into the epoxy mold (not shown). Wrap the braided and laced winding around the hoop with the numbers facing out and the last 3 turnaround coils laying on top of the 3 finish turns 6, 5 and 4 so that the start and finish are in the same plane.

Secure the braided and lace winding to the hoop with a nylon strap (not show). Tighten the strap until the coil is uniform and the free ends are in line in the same plane and lace the free ends with lacing cord, Be sure the central compressed active regions do not overlap are aligned properly.

Thermistors may be added in various locations, including where the turn around coils meet the free ends.

After the winding is laced, it is put into a mold and epoxied. For an axial winding, a two-part (clamshell) mold can be used to epoxy the stitched winding. For a radial winding, a six-part mold is possible. This includes one inner diameter mold, three-piece outer diameter molds, and two face molds. The potting material should be thermally conductive epoxy type resin. For example, epoxy doped with boron nitride. Boron nitride as filler, although more expensive, is lighter than aluminum oxide, so better for aerospace applications.

The stator yoke portions 43*f* and 43*b* (FIGS. 3 and 4) and cooling fins 42 and 44 (FIGS. 3 and 4) are attached to the ends 40*e* (FIG. 4) of the stator 40 after it is the winding has been epoxied.

It is worthy to note that any reference to "one embodiment" or "an embodiment" means that a particular feature, structure, or characteristic described in connection with the embodiment may be included in an embodiment, if desired. The appearances of the phrase "in one embodiment" in various places in the specification are not necessarily all referring to the same embodiment.

The illustrations and examples provided herein are for explanatory purposes and are not intended to limit the scope of the appended claims. This disclosure is to be considered an exemplification of the principles of the invention and is not intended to limit the spirit and scope of the invention and/or claims of the embodiment illustrated.

Those skilled in the art will make modifications to the invention for particular applications of the invention.

The discussion included in this patent is intended to serve as a basic description. The reader should be aware that the specific discussion may not explicitly describe all embodiments possible and alternatives are implicit. Also, this discussion may not fully explain the generic nature of the invention and may not explicitly show how each feature or element can actually be representative or equivalent elements. Again, these are implicitly included in this disclosure. Where the invention is described in device-oriented terminology, each element of the device implicitly performs a function. It should also be understood that a variety of changes may be made without departing from the essence of the invention. Such changes are also implicitly included in the description. These changes still fall within the scope of this invention.

Further, each of the various elements of the invention and claims may also be achieved in a variety of manners. This disclosure should be understood to encompass each such variation, be it a variation of any apparatus embodiment, a method embodiment, or even merely a variation of any element of these. Particularly, it should be understood that as the disclosure relates to elements of the invention, the words for each element may be expressed by equivalent apparatus terms even if only the function or result is the same. Such equivalent, broader, or even more generic terms should be considered to be encompassed in the description of each element or action. Such terms can be substituted where desired to make explicit the implicitly broad coverage to which this invention is entitled. It should be understood that all actions may be expressed as a means for taking that action or as an element which causes that action. Similarly, each physical element disclosed should be understood to encompass a disclosure of the action which that physical element facilitates. Such changes and alternative terms are to be understood to be explicitly included in the description.

Having described this invention in connection with a number of embodiments, modification will now certainly suggest itself to those skilled in the art. The example embodiments herein are not intended to be limiting, various configurations and combinations of features are possible. As such, the invention is not limited to the disclosed embodiments, except as required by the appended claims.

What is claimed is:

1. A motor winding comprising a high density multi-conductor wire bundle comprising a compacted Litz wire bundle comprising:
    a) a serpentine configuration comprising a central portion and end turns;
    b) wherein the central portion comprises compacted Litz wire and wherein the end turns comprise non-compacted rectangular cross section Litz wire; and
    c) wherein the motor winding comprises a coreless winding.

2. The motor winding of claim 1, wherein the central portion extends in a plane and the end turns extend out of the plane.

3. The motor winding of claim 1, wherein the central portion has a thickness and a width, and wherein the thickness of the central portion is less than the width of the central portion.

4. The motor winding of claim 3, wherein the end turns have a thickness and a width, and wherein the thickness of the end turns are less than the width of the end turns.

5. The motor winding of claim 3, wherein the thickness of the central portion is approximately 0.09 inches.

6. The motor winding of claim 5, wherein the width of the central portion is about 0.425 inches or less.

7. The motor winding of claim 1, wherein the multiple compacted Litz wire bundles are woven.

8. The motor winding of claim 1, wherein the multiple compacted Litz wire bundles are layered.

9. The motor winding of claim 1, wherein the multiple compacted Litz wire bundles are woven in layers.

10. The motor winding of claim 1, wherein the motor winding is a stator winding.

11. The motor winding of claim 1, wherein the winding is encased in a thermally conductive epoxy.

12. The motor winding of claim 11, wherein the thermally conductive epoxy comprises boron nitride.

13. The motor winding of claim 11, wherein the motor winding is laced together, and wherein the thermally conductive epoxy encases the laced motor winding.

14. A motor stator winding comprising a high density multi-conductor winding comprising multiple Litz wire bundles each comprising a serpentine configuration with a compacted central portion and non-compacted rectangular cross section end turns, the compacted central portion having a thickness and a width such that the thickness of the compacted central portion is less than the width of the compacted central portion, and wherein the multiple Litz wire bundles are at least one of: (a) woven; (b) layered; or (c) combinations thereof and encased in a thermally conductive epoxy, wherein the motor stator winding comprises a coreless stator winding.

15. The motor stator winding of claim 14, wherein the thermally conductive epoxy comprises boron nitride.

16. The motor stator winding of claim 14, wherein the each of the multiple Litz wire bundles comprises end turns, and wherein the compacted central portions are generally within a plane and wherein the end turns are turn turned out of the plane so as to minimize a thickness of the multiple Litz wire bundles in a central region of the stator.

17. The motor stator winding of claim 16, wherein the non-compacted end turns have a thickness and a width, and wherein the thickness of the non-compacted end turns are less than the width of the non-compacted end turns.

18. The motor stator winding of claim 14, wherein the thickness of the central portion is approximately 0.09 inches and the width of the central portion is about 0.425 inches or less.

19. The motor stator winding of claim 14, wherein the multiple Litz wire bundles are stitched together.

20. A motor stator winding comprising a high density multi-conductor winding comprising multiple Litz wire bundles each comprising a serpentine configuration, each of the multiple Litz wire bundles comprising a compacted central portion and non-compacted rectangular cross section end turns, and wherein the compacted central portion has a first thickness and a first width, and wherein the first thickness is less than the first width; and wherein the non-compacted end turns have a second thickness and a second width, and wherein the second thickness is less than the second width of the end turns, and wherein the multiple Litz wire bundles being at least one of: (a) woven; (b) layered; or (c) combinations thereof, the multiple Litz wire bundles being laced together and encased in a thermally conductive epoxy, wherein the motor winding comprises a coreless winding.

21. The motor winding of claim 20, wherein the multiple compacted Litz wire bundles are woven.

22. The motor winding of claim 20, wherein the multiple compacted Litz wire bundles are layered.

23. The motor winding of claim 20, wherein the multiple compacted Litz wire bundles are woven in layers.

24. The motor winding of claim 20, wherein the thickness of the central portion is approximately 0.09 inches and the width of the central portion is about 0.425 inches or less.

* * * * *